(12) United States Patent
Cohen et al.

(10) Patent No.: US 11,107,207 B2
(45) Date of Patent: Aug. 31, 2021

(54) DETECTING TARGETED LOCATIONS IN A SEMICONDUCTOR SPECIMEN

(71) Applicant: Applied Materials Israel Ltd., Rehovot (IL)

(72) Inventors: Elad Cohen, Beer Sheva (IL); Yuri Feigin, Ashdod (IL); Lior Katz, Jerusalem (IL); Eyal Neistein, Herzliya (IL)

(73) Assignee: Applied Materials Israel Ltd., Rehovot (IL)

( * ) Notice: Subject to any disclaimer, the term of this patent is extended or adjusted under 35 U.S.C. 154(b) by 97 days.

(21) Appl. No.: 16/533,737

(22) Filed: Aug. 6, 2019

(65) Prior Publication Data

US 2021/0042905 A1 Feb. 11, 2021

(51) Int. Cl.
*G06T 7/00* (2017.01)
*G06T 7/70* (2017.01)

(52) U.S. Cl.
CPC ............ *G06T 7/0004* (2013.01); *G06T 7/70* (2017.01); *G06T 2207/20076* (2013.01); *G06T 2207/30148* (2013.01)

(58) Field of Classification Search
CPC ......... G06T 7/0004; G06T 2207/30148; G06T 7/70; G06T 2207/20076; G06T 2207/30108; G01N 21/9501; G01N 21/8851
See application file for complete search history.

(56) References Cited

U.S. PATENT DOCUMENTS

| 2017/0177997 | A1* | 6/2017 | Karlinsky | ............ G06K 9/6271 |
| 2019/0067134 | A1* | 2/2019 | Sofer | ............... G05B 19/41875 |
| 2020/0267962 | A1 | 8/2020 | Virag | |

* cited by examiner

*Primary Examiner* — Ping Y Hsieh
*Assistant Examiner* — Xiao Liu
(74) *Attorney, Agent, or Firm* — Lowenstein Sandler LLP

(57) ABSTRACT

A method and system for detecting defects in a specimen, the method comprising: obtaining an image comprising a plurality of pixels of a specimen part; processing the image according to a detection recipe to derive information related to potential defects in the specimen, the information comprising a first data set informative of first locations identified, in accordance with the detection recipe as locations of potential defects, and a second data set informative of second locations not identified as locations of potential defects; receiving data specifying targeted locations of interest within the part of the specimen; when the first data set is not informative of each targeted location, generating a third data set by adding to the first data set information related to the missing targeted location from the second data set, the information bearing an indication that it corresponds to a targeted location; and outputting the third data set.

20 Claims, 4 Drawing Sheets

DETECTING TARGETED LOCATIONS IN A SEMICONDUCTOR SPECIMEN

TECHNICAL FIELD

The presently disclosed subject matter relates, in general, to the field of examination of a specimen, and more specifically, to methods and systems capable of automated detection of defects.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed examination of the devices while they are still in the form of semiconductor specimens.

The term "specimen" used in this specification should be expansively construed to cover any kind of wafer, mask, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

The complex manufacturing process of specimens is not error-free and such errors may cause faults in manufactured devices. The faults may include defects that can harm operation of the device, and nuisances, which may be defects, but do not cause any harm or malfunction of the manufactured device. By way of non-limiting example, defects may be caused during the manufacturing process, due to faults in the raw material, mechanical, electrical or optical errors, human errors, or others. Further, defects may be caused by spatio-temporal factors, such as temperature changes of the wafer occurring after one or more manufacturing stages during the examination process, which may cause some deformations of the wafer.

Unless specifically stated otherwise, the term "examination" used in this specification should be expansively construed to cover any kind of detection and/or classification of defects in an object. Examination is provided by using non-destructive examination tools during or after manufacture of the object to be examined. By way of non-limiting example, the examination process can include scanning (in a single scan or in multiple scans), sampling, reviewing, measuring, classifying and/or other operations provided with regard to the object or parts thereof, using one or more examination tools. Likewise, examination can be provided prior to manufacture of the object to be examined, and can include, for example, generating an examination recipe(s).

It is noted that, unless specifically stated otherwise, the term "examination" or its derivatives used in this specification, is not limited with respect to the size of the inspected area(s), to the speed or resolution of the scanning, or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a plurality of times, for example after the manufacturing or processing of certain layers, or the like. Additionally or alternatively, each examination step can be repeated multiple times, for example for different specimen locations, or for the same specimen locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects, and obtain information describing the location of the defect and optionally its environment, and other inspection attributes thereof.

At the review step, images of at least some of the defects detected during the inspection phase are, typically, captured at relatively low speed and/or high-resolution, thereby enabling verification, classification and, optionally, other analyses of the at least some of the defects. In some cases, both phases can be implemented by the same inspection tool, and, in some other cases, these two phases are implemented by different inspection tools.

GENERAL DESCRIPTION

In accordance with a certain aspect of the presently disclosed subject matter, there is provided an examination system to detect defects in a specimen, the system comprising a processing and memory circuitry (PMC) for: obtaining an image of at least a part of a specimen, the image comprising a plurality of pixels, the image acquired by an examination tool; processing the image in accordance with a detection recipe to derive information related to potential defects in the specimen, wherein said information comprises a first data set informative of first locations identified, in accordance with the detection recipe as locations of potential defects, and a second data set informative of second locations not identified, in accordance with the detection recipe, as locations of potential defects; receiving data specifying one or more targeted locations of interest within the at least a part of the specimen; when the first data set is not informative of each targeted location, generate a third data set by adding to the first data set information related to a missing targeted location from the second data set, the added information bearing an indication that it corresponds to the missing targeted location; and outputting the third data set. Within the system, the information related to the missing targeted location optionally comprises one or more items selected from the group consisting of: a pattern, a reference gray level, a noise level; and details output in accordance with the detection recipe in accordance with the at least one targeted location. Within the system the targeted locations optionally comprise a plurality of targeted locations spread at locations over at least the part of the specimen. Within the system the detection recipe optionally comprises a set of instructions, comprising: determining a score for each pixel from the plurality of pixels, the score indicative of a probability that the pixel reflects a defect or a part of a defect; setting a threshold; and detecting as potential defects only pixels for which the respective score exceeds the threshold. Within the system, the PMC optionally further updates the detection recipe such that the score exceeds the threshold. Within the system, the PMC optionally further: receives one or more characteristics of a defect of interest located at one of the targeted locations; and modifies within the image one or more pixels from the plurality of pixels corresponding to the targeted location, wherein the modification is performed in accordance with the characteristics of the defect of interest, thereby planting the defect of interest into the image.

In accordance with another aspect of the presently disclosed subject matter, there is provided an examination system to detect defects in a specimen, the system comprising a processing and memory circuitry (PMC) for: receiving data specifying one or more targeted locations of interest within at least a part of the specimen, wherein the targeted locations differ from locations of potential defects previously revealed in accordance with a detection recipe; obtaining an image of the at least a part of the specimen, the image acquired by an examination tool; processing the image, in accordance with the detection recipe to derive information related to the targeted locations; and outputting the information related to the at least one targeted location, the information associated with an indication that the information relates to a targeted location. Within the system, the information related to targeted locations is optionally output along with information related to the locations of potential defects. Within the system, the output information optionally comprises one or more items selected from the group consisting of: a pattern, a reference gray level, a noise level; and details output by the detection recipe in accordance with the at least one targeted location. Within the system, the targeted locations are optionally received with additional information. Within the system, the targeted locations optionally comprise a plurality of mandatory locations of interest spread at locations over the specimen. Within the system, the detection recipe optionally comprises a set of instructions, comprising: determining a score for each pixel from the plurality of pixels, the score indicative of a probability that the pixel reflects a defect or a part thereof; setting a threshold; and detecting as potential defects only pixels for which the respective score exceeds the threshold. Within the system, the PMC optionally further updates the detection recipe in accordance with the score. Within the system, the PMC optionally further: receives one or more characteristics of a defect of interest located at the location of interest; and modifies within the image one or more pixels from the plurality of pixels corresponding to the location of interest, wherein the modification is provided in accordance with the characteristics of the defect of interest, thereby planting the defect of interest into the image.

In accordance with another aspect of the presently disclosed subject matter, there is provided a method of specimen examination comprising: obtaining an image of at least a part of a specimen, the image comprising a plurality of pixels, the image acquired by an examination tool; processing the image by a processor in accordance with a detection recipe to derive information related to potential defects in the specimen, wherein said information comprises a first data set informative of first locations identified, in accordance with the detection recipe, as locations of potential defects, and a second data set informative of second locations not identified, in accordance with the detection recipe, as locations of potential defects; receiving data specifying at least one targeted location of interest within the at least a part of the specimen; when the first data set is not informative of the at least one targeted location, generating a third data set by adding to the first data set information related to the at least one targeted location from the second data set, the added information bearing an indication that it corresponds to the at least one targeted location; and outputting the third data set. Within the method, the information related to the targeted locations optionally comprises one or more items selected from the group consisting of: a pattern, a reference gray level, a noise level; and details output in accordance with the detection recipe in accordance with the targeted locations. Within the method, the targeted locations optionally comprise a plurality of targeted locations spread at locations over at least the part of the specimen. Within the method, the detection recipe optionally comprises a set of instructions, comprising: determining a score for each pixel from the plurality of pixels, the score indicative of a probability that the pixel reflects a defect or a part of a defect; setting a threshold; and detecting as potential defects only pixels for which the respective score exceeds the threshold. The method can further comprise updating the detection recipe such that the score exceeds the threshold. The method can further comprise: receiving one or more characteristics of a defect of interest located at a targeted location; and modifying within the image one or more pixels from the plurality of pixels corresponding to the targeted location, wherein the modification is performed in accordance with the characteristics of the defect of interest, thereby planting the defect of interest into the image.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
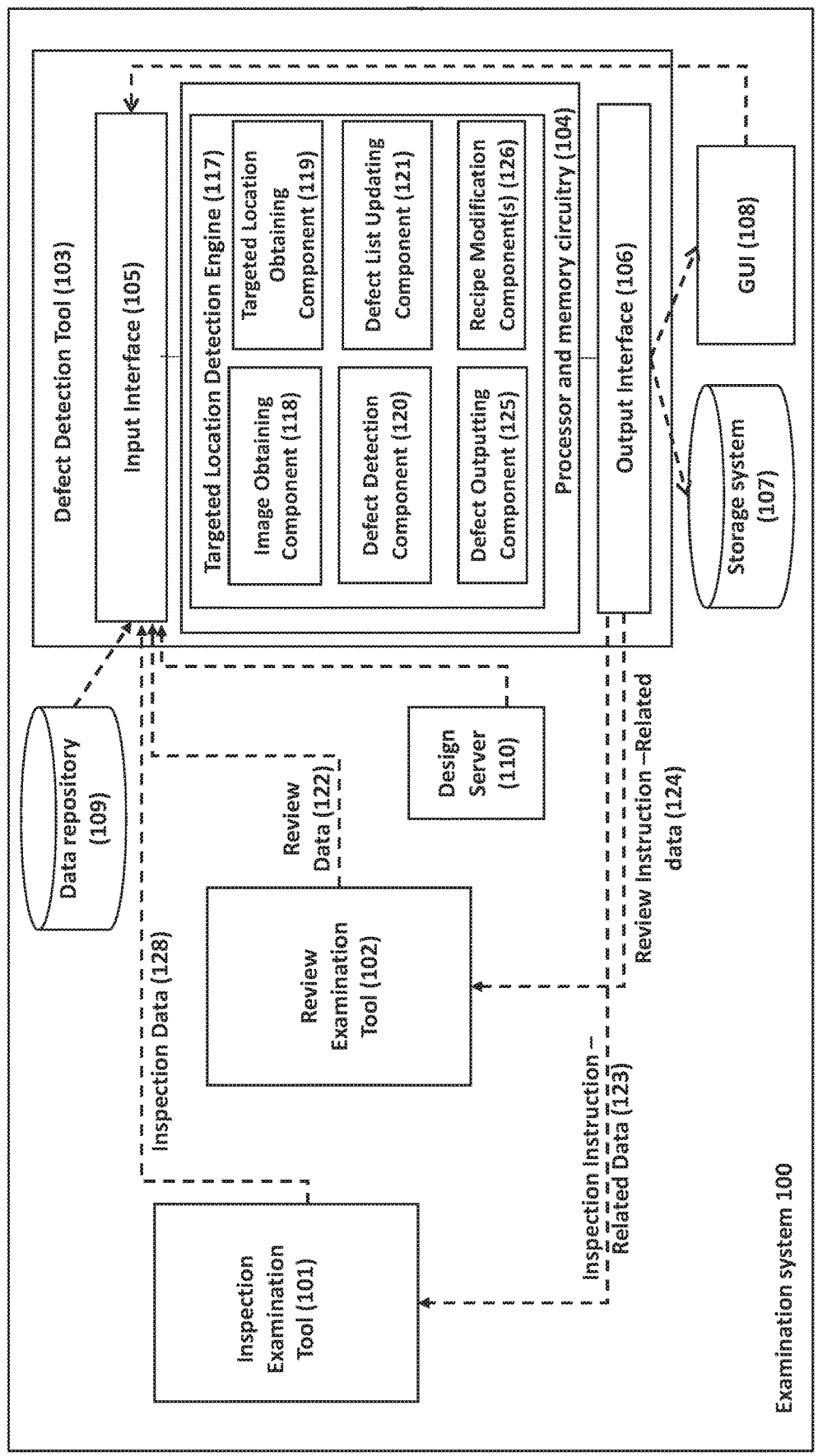
FIG. 1 illustrates a generalized block diagram of an examination system, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "obtaining", "deriving", "representing", "calculating", "generating", "assigning", "selecting", "determining", "receiving", "training", "applying", "outputting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the classifier and PMC therein disclosed in the present application.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The term "detection recipe" used in this specification, should be expansively construed to cover any collection or sequence of algorithms, parameters, thresholds or other structures, implemented for detecting potential defects in an image of a specimen captured by an examination tool. The detection recipe may assign a score to each location, for example each pixel in the image, the score indicating the probability that a defect exists at the location of the specimen corresponding to the pixel.

In a typical examination of an object, one or more images of the object are taken at relatively high speed and/or low resolution, and are then examined for detecting potential defects which may be further reviewed. Typically, a large number of potential defects are observed, for example in the order of magnitude of millions. Each potential defect may be associated with values for a number of characteristics descriptive of the defect or its environment. However, it is practically impossible to further review each such potential defect, to determine whether it is a real defect and/or to further examine it. Thus, a minority of the potential defects are detected upon the characteristics, reported, and may, or may not, be further reviewed.

Due to the large number of defects in a wafer, which may be in the order of magnitude of millions, it is impractical to expect that all defects are detected in one or more images captured during inspection, and that all detected defects are further reviewed. Thus, it is important to make sure that defects which are important or representative by their nature as may be defined by a user, or are located at specifically important or representative locations on the wafer, are indeed detected.

When setting up a system for examining a specimen, there may be one or more defects of certain types, locations or other characteristics which are important to detect. The importance may be due to known needs or requirements, for example a need to receive information related to a certain type of defect, to previously known defects, or any other reason. An additional situation may be the need to examine a specific location or area of the examined object. However, such defects or locations may go unreported, for a number of reasons. A first reason may be that the defect was not present on the object, and thus could not be detected. A similar situation is in which no defect is expected to be present at a specific location, but it is still required to obtain information about the location. Another reason may be that a defect was present, but the detection recipe was deficient, set up with parameters which are inadequate for detecting the specific defect, or used ineffective thresholds such that the defect is not output. Since the defect is not detected, it is impossible to distinguish between the cases. Even further, when the defect is known to exist, in the absence of information related to the location or area of the defect, it is practically impossible to investigate the reason for the defect going undetected, for example which algorithm or stage thereof, parameter or threshold of the detection recipe should be changed, added or deleted, such that the defect is detected.

Thus, evaluating, correcting or enhancing of the detection recipe, or parameters or thresholds thereof, such that required or potential defects are detected, may not be possible or efficient, in the absence of information about the relevant defects, or when the defects are not detected and thus no information about their locations is available.

The disclosed subject matter provides a method and apparatus for testing the detection of required defects or locations, referred to as "targeted locations".

In accordance with the disclosure, one or more targeted locations of a defect of interest may be received, for example through a user interface operated by a user, a file, or the like.

When an image is received, for example from an inspection device, it may be analyzed using a detection recipe, for detecting defects. Analyzing may include associating information with and assigning a score to a plurality of locations, or even each location within the examined specimen. The information may include a score indicating a probability that the location is associated with a defect, noise level in the vicinity of the location, a pattern the location is associated with, location within a chip, or the like.

A threshold may then be applied, such that locations having a score equal to, or exceeding the threshold, are reported as defects, while locations having a score below the threshold are not reported.

In accordance with some embodiments of the disclosure, a location of a defect of interest may be added to the locations reported to the user, such that the location of the defect is reported as though the defect was detected by the detection recipe, along with the related information, and the score assigned to the location, although the score is below the threshold.

The location may then be examined using the information associated therewith. For example, it may be determined how close the score assigned to the location of the defect is to the threshold, and thus to which degree it is required to lower the threshold in order that the defect be detected by the detection recipe. In some embodiments, the additional information may be helpful in determining what caused the score to be below the threshold. The detection recipe may then be enhanced or corrected, in order for the targeted locations, and locations comprising similar patterns or otherwise resembling the targeted locations, to be detected as potential defects.

Thus, once the location is reported to a user, any required analysis of the location or its vicinity may be performed, although the location was not detected by the detection recipe.

In some embodiments, once examination results of a specimen are available, a targeted location of a defect of interest may be added to the reported defects, if the reported defects do not already contain said location. Since a score and additional information is associated with every location within the specimen during the defect detection, regardless of whether the score exceeds the threshold or not, the score and information are available. Thus, once a targeted location has been added to the list of defects, the score and information may be retrieved and associated with the targeted location, as is done for any other reported location.

In further embodiments, a targeted location may be checked against previously detected locations, in order to determine whether a defect was detected at the location, e.g., the location was assigned a score that exceeded the threshold. If the location differs from all detected defects, an image comprising the location may be processed to derive information related to the targeted location, for example calculating a score assigned to the location. The detected locations, as well as the targeted location, may then be output. The targeted location may carry an indication that it is a targeted location and was not detected by the detection recipe. For example, the indication may be the score assigned to the targeted location, which is lower than the threshold.

In some embodiments, adding the targeted locations to the reported locations may be combined with planting defects on a received image, as described for example in U.S. patent application Ser. No. 16/425,859 filed on May 29, 2019, titled "Detecting Defects in a Semiconductor Specimen" and assigned to the same assignee as the current application. Once an image is received from an examination device, the image may be modified, for example by modifying values of pixels in the image, in accordance with the characteristics and location of each such received defect. This provides for obtaining a modified image which contains a defect that was not present in the examined object. Such a defect may thus be referred to as a "planted" defect.

Once an image is modified to include a planted defect, it is known that the defect is present at a specific location. If the defect is not reported, it can be assumed that this is because it is not discovered due to a deficiency or a problem in the recipe, or in a parameter or threshold thereof. However, if the defect location is not reported, the cause cannot be investigated, thus limiting the ability to correct the recipe, parameters or thresholds. By forcing the reporting of the defect location, even if its score is below the threshold, information may be received related to the location, which can be used in amending the recipe, parameters or thresholds.

Bearing this in mind, attention is drawn to FIG. 1 illustrating a generalized block diagram of an examination system in accordance with certain embodiments of the presently disclosed subject matter. Examination system 100 illustrated in FIG. 1 can be used for examination of a specimen (e.g. a wafer and/or parts thereof) as a part of specimen fabrication. Examination can be part of the examination setup, object fabrication, and can be carried out during manufacturing the object, or afterwards. The examination system can include a variety of examination tools, for example, one or more inspection examination tools 101 for capturing inspection images (typically, at relatively high speed and/or low resolution), and one or more review examination tools 102 for capturing review images of at least some defects detected by inspection tools 101 (typically, at relatively low speed and/or high resolution). The illustrated examination system 100 further includes a computer-based automated defect detection tool 103 capable of automatically detecting defects within an image, such as an image captured by inspection examination tool 101. By way of non-limiting example, defect detection may have different purposes, such as determining which defects or areas of the object to review with review examination tool 102, determining a status of the examined object, classifying defects, or others.

A user can view the detected or reported defects with the help of GUI 108. Further, GUI 108 may enable the user (and/or management system) to set parameters for certain detection tasks, set thresholds, introduce locations within the object to be targeted locations, i.e. locations reported as containing defects regardless of whether they contain a defect or not, optimize the detection results in accordance with user requirements, or the like. In some embodiments, GUI 108 may enable the user to introduce defects to be planted, within an image, such that the defects may be detected.

Defect detection tool 103 can be operatively connected to one or more inspection tools 101 and/or one or more review tools 102. Optionally, defect detection tool 103 can be fully or partly integrated with one or more inspection tools 101 or with one or more review tools 102. Defect detection tool 103 can be further operatively connected to design server 110 and/or data repository 109. Data repository 109 can include, for example, data related to defects or locations that should be provided as targeted locations, i.e., reported in a captured image, whether they are associated with defects or not, in order to gain access to information related to the defects or locations, and enable analysis of why such defects were not detected by the detection recipe.

A specimen can be examined by inspection tool 101 (e.g. an optical inspection system, low-resolution SEM, etc.). The resulting images and/or derivatives can be processed (optionally together with other data as, for example, design data and/or defect classification data) to detect potential defects and provide targeted locations for review.

A subset of potential defect locations, detected for review by defect detection tool 103 and targeted locations, can be reviewed by review tool 102 (e.g. a scanning electron microscope (SEM) or Atomic Force Microscopy (AFM), etc.). Some of the targeted locations may also be associated with defects planted within an image.

Additionally or alternatively, data 122 (referred to hereinafter as review data) informative of review images and/or derivatives thereof and respective associated metadata, can be transmitted—directly, or via one or more intermediate systems—to defect detection tool 103. It is noted that review data 122 can include data generated by the one or more intermediate systems as derivatives of review images.

Defect detection tool 103 can include a processor and memory circuitry (PMC, the processor and memory circuitry are not shown separately) 104 operatively connected to a hardware-based input interface 105 and/or to a hardware-based output interface 106. PMC 104 can provide processing necessary for operating targeted location detection engine 117 as further detailed with reference to FIG. 3 and FIG. 4. As will be further detailed with reference to FIGS. 3 and 4, PMC 104 can execute several functional components in accordance with computer-readable instructions implemented on a non-transitory computer-readable storage medium. Such functional components are referred to hereinafter as included in PMC 104.

Processing results of defect detection tool 103 output by output interface 106, may be used to determine and provide inspection instructions related data 123 or review instruction related data 124 to inspection examination tools 101 or review examination tools 102, respectively, in order to modify their operation, for example by changing values of operation parameters.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some of examination tools 101 and/or 102, data repository 109, storage system 107, design server 110 and/or GUI 108 can be external to the examination system 100 and operate in data communication with defect detection tool 103 via input interface 105 and output interface 106. Defect detection tool 103 can be implemented as a stand-alone computer(s) to be used in conjunction with one or more examination tools. Optionally, defect detection tool 103 can operate on pre-acquired inspection data stored in data repositories 109 and/or storage system 107. Alternatively or additionally, the respective functions of defect detection tool 103 can, at least partly, be integrated with one or more examination tools, process control tools, recipe generation tools, systems for automatic defects review and/or classification, and/or other systems related to examination.

PMC 104 can include targeted location detection engine 117, which can include or be operatively connected to: image obtaining component 118, targeted location obtaining component 119, defect detection component 120, defect list updating component 121, defect reporting component 125 and recipe modification component(s) 126.

Image obtaining component 118 can be used for obtaining and storing in memory one or more captured images captured by inspection examination tool 101. The images may be obtained directly from inspection examination tool 101, from data repositories 109, and/or storage system 107.

Targeted location obtaining component 119 can obtain one or more targeted locations within the object, wherein it is required to detect these locations, such that the locations are reported, whether a defect is detected there or not. The locations can be obtained from a user using GUI 108, whether as numeric values, or by pointing at them, read from a file or a stream, or the like.

Defect detection component 120 can apply one or more defect detection recipes on the obtained image, to detect one or more potential defects. In some embodiments, defect detection component 120 can assign a score to each location, for example each pixel in the image, indicating a probability that there is a defect or part thereof at the location. Since it is impossible to review all locations, defect detection component 120 can provide a list of those locations whose score exceeds a predetermined threshold, since they are more likely to represent defects than other locations.

Defect list updating component 121 can determine whether a particular targeted location appears in the list output by defect detection component 120 or not, and if not, add a targeted location, optionally with additional information, to the list of potential defects provided by defect detection component 120, and optionally associate an indication that the location is a targeted location. In some embodiments, some flexibility may be allowed, for example if a location that is distant from the defect in at most a predetermined distance, for example up to 3 pixels is detected, it may be considered that the targeted location was output.

Defect outputting component 125 can output the locations detected by defect detection component 120, as manipulated by defect list updating component 121, such that a user or a system receiving the output defects can determine the effectivity of defect detection component 120, examine the reported defects which are targeted locations that received a score lower than the threshold, or the like. Outputting can relate to displaying locations and optionally additional information to a user over GUI 108, storing in a file, or the like.

Recipe modification component 126 may modify, add, or remove a part or algorithm of the applied detection recipe, or change a parameter or a threshold thereof, such that one or more of the targeted locations that have not been detected, will be detected using the modified recipe. In some embodiments, the capturing parameters used by inspection examination tool 101 may also be modified, including for example polarization, illumination angle, illumination amplitude, or the like.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

Figure 2A:
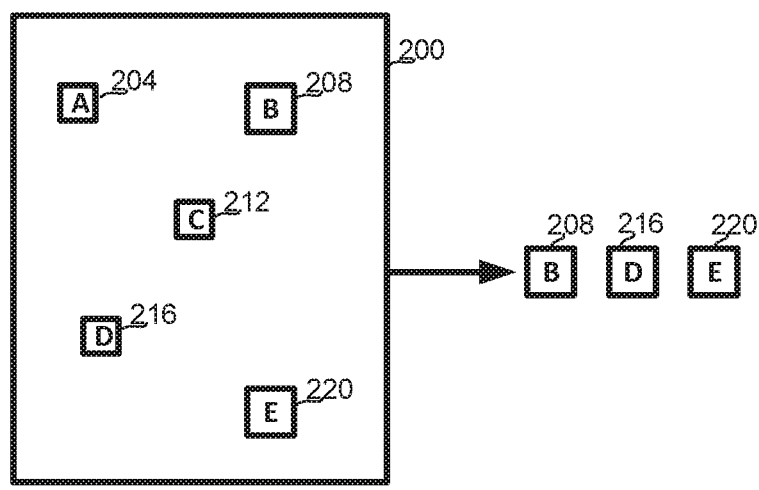
FIG. 2A and FIG. 2B demonstrate a schematic illustration of defect detection in accordance with certain embodiments of the presently disclosed subject matter.
Figure 2B:
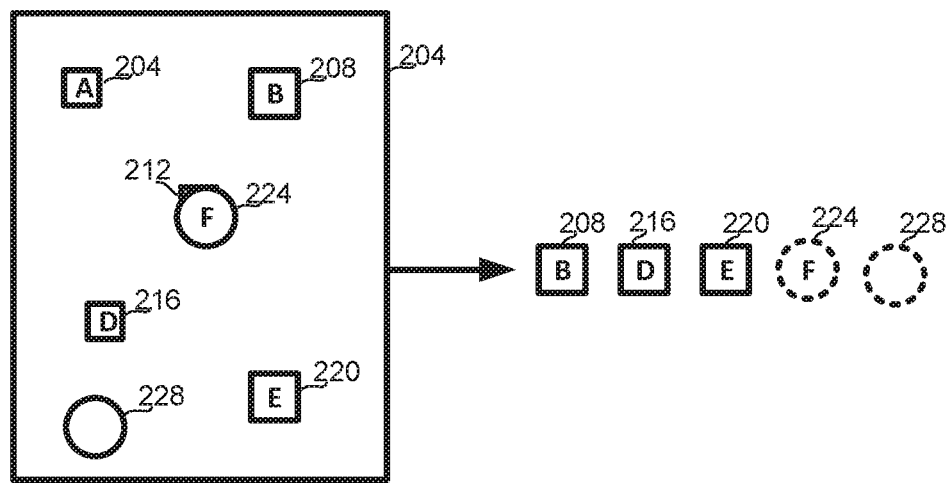

Reference is now made to FIG. 2A and FIG. 2B, demonstrating defect detection in accordance with the disclosure.

FIG. 2A shows a schematic illustration of an examined object 200, having defects A 204, B 208, C 212, D 216 and E 220. The defect detection system, with the applied detection recipe, detects defects B 208, D 216, and E 220.

However, an operator, management or another entity in charge of object 200 also requires that the area of defect C 212 must be detected, since the area is of specific importance. It is also required that location 228 is detected. Thus, in accordance with the disclosure, location 228 and the location of defect C 212 are added as targeted locations. In addition, a defect F 224 may be planted in image 204 in substantially the same location as defect C 212 (for clarity purposes defects C 212 and F 224 are shown to not fully overlap), and another defect may be planted in image 204 at location 228.

Then, when defects are detected in object 200, it may be examined whether any of the reported locations is location 228, or the location of defect C 212. If any of them is not detected, a corresponding targeted location may be added to the reported results, with the corresponding score assigned to each location. The targeted locations are then output together with defect B 208, defect D 216 and defect E 220, but with a score lower than the detection threshold. The addition of a targeted location at the location of defect F 224 may enable a user to determine why defect F 224 was not detected, although it is known to have been added to image 204. The addition of a targeted location at the location of 228 may also enable a user to examine location 228, which is now output.

Figure 3:
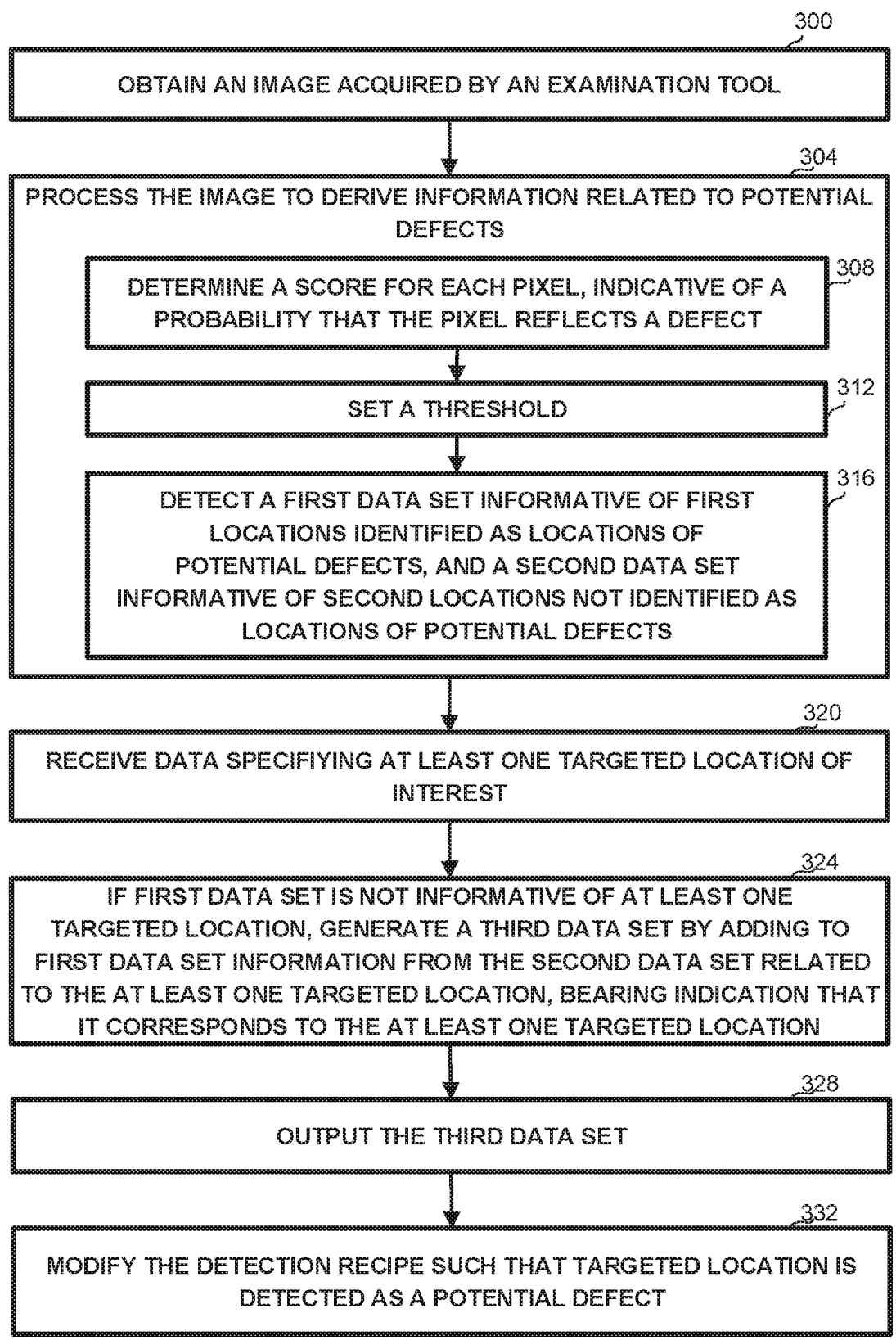
FIG. 3 illustrates a generalized flow-chart of detecting defects in a specimen, in accordance with certain embodiments of the presently disclosed subject matter.

Referring to FIG. 3, there is illustrated a generalized flow-chart of detecting defects in a specimen, in accordance with certain embodiments of the presently disclosed subject matter. PMC 104 can execute the respective operations detailed below in accordance with computer-readable instructions implemented on a non-transitory computer-readable storage medium.

The flowchart of FIG. 3 can be used in a plurality of scenarios. One scenario relates to a setup situation, in which a recipe for testing specimens of a specific type is determined. Another scenario is when it is required to examine certain areas of the specimen.

Image obtaining component 118 can obtain (300) an image of a specimen, or a part of a specimen, the image acquired by an examination tool, such as inspection examination tool 101. The image may be obtained directly from inspection examination tool 101, from a storage device, or the like.

In some embodiments, the image may be modified to comprise artificial or planted defects at one or more locations, as described for example in patent application U.S. patent application Ser. No. 16/425,859 assigned to the same assignee as the current application and incorporated herewith by reference. One or more of the locations of the planted defects may be the same as one or more of the targeted locations.

Defect detection component 120 can process the image obtained (300) by image obtaining component 118, to derive (304) information related to potential defects in the specimen. Processing the image (304) may include applying one or more detection recipes, and determining a score (308) for each pixel within the image, the score indicative of a probability that the pixel represents a defect or part of a defect. One or more thresholds may then be set (312) by a user using GUI 108, from a file, or as a predetermined value. A constant threshold may be used for the whole image. Additionally or alternatively, different areas of the image may be associated with different thresholds.

Potential defects may then be detected (316) at the locations of pixels having a score that exceeds the applicable threshold. Determining the score (308) and/or setting the threshold (312) may be performed in accordance with an applicable detection recipe.

Thus, defect detection component 120 may obtain a first data set informative of first locations identified as locations of potential defects, and a second data set, informative of second locations not identified as locations of potential defects.

Targeted location obtaining component 118 may receive (320) through GUI 108, or another component adapted to read locations from a source such as a file, data specifying one or more targeted locations of interest within the specimen or part thereof, the information including at least the targeted location of interest within an image, within the specimen, or the like.

It will be appreciated that obtaining the targeted locations (320) and obtaining the image (304) may be performed in any required order, simultaneously, or the like. Processing the image (304) may also be performed before or after obtaining the targeted locations (320).

Defect list updating component 121 may then determine whether the first set is informative of each of the targeted locations of interest, i.e., whether each targeted location was detected as a potential defect. If one or more targeted locations of interest were not detected as potential defects, then a third data set may be generated by adding (324) information from the second data set, related to each of the non-detected targeted locations of interest, to the first data set. The added information may bear an indication that it corresponds to a targeted location, rather than a location identified as a potential defect.

Defect outputting component 125 may then output (328) the third data set to a user, to a file, to another system, or the like. Each location within the third data set is associated with its assigned score or indication, and optionally with additional information obtained by processing (304) the image. It may be known whether each location was detected as a potential defect, either in accordance with an indication, or in accordance with the score of the location.

In some situations, for example, when the output comprises targeted locations in which defects have not been detected, then recipe modification component 126 may modify (332) the detection recipe used for detecting the defects. In some embodiments, the image capturing parameters or thresholds may be modified. In further embodiments, the detection recipe or parts, parameters or thresholds thereof, may be changed, subject to the defects not being detected.

Figure 4:
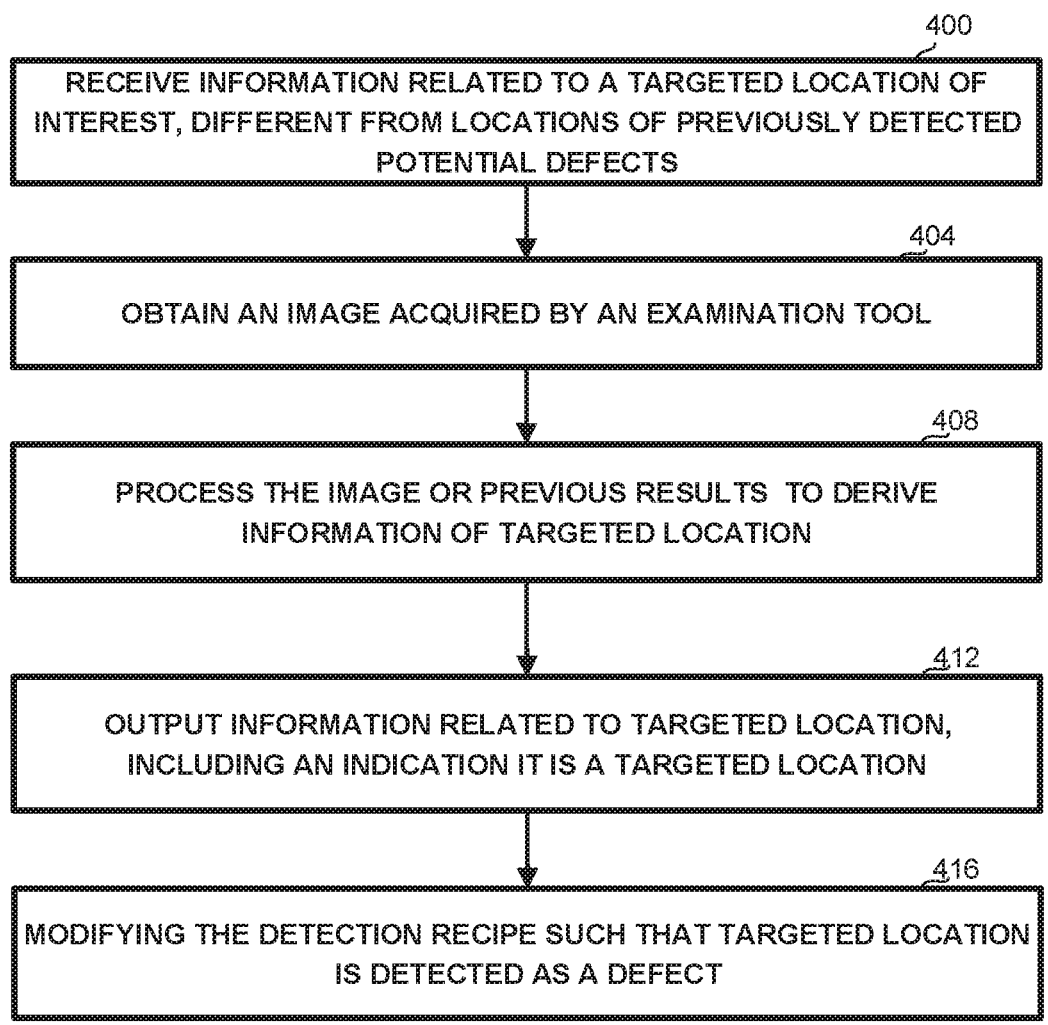
FIG. 4 illustrates another generalized flow-chart of detecting defects in a specimen, in accordance with certain embodiments of the presently disclosed subject matter.

Referring now to FIG. 4, there is illustrated a generalized flow-chart of another method for detecting defects in a specimen, in accordance with certain embodiments of the presently disclosed subject matter. PMC 104 can execute the respective operations detailed below in accordance with computer-readable instructions implemented on a non-transitory computer-readable storage medium.

The flowchart of FIG. 4 can also be used in a plurality of scenarios. One scenario relates to a setup situation, in which a recipe for testing specimens of a specific type is determined. Another scenario is when it is required to examine certain areas of the specimen.

Targeted location obtaining component 118 may receive (400) information related to one or more targeted locations of interest, through GUI 108, or another component adapted to read locations from a source such as a file.

Targeted location obtaining component 118, or another component, may determine whether each of the targeted locations is different from locations in which potential defects have been previously detected. The potential defects may have been previously obtained as described for example in association with processing 308 of FIG. 3.

Image obtaining component 118 can obtain (404) an image acquired by an examination tool, such as inspection examination tool 101. The image may be obtained directly from inspection examination tool 101, from a storage device, or the like. The image may be the same image upon which the potential defects have previously been obtained, or a different image.

In some embodiments, the image may be modified to comprise artificial or planted defects at one or more locations. One or more of the locations of the planted defects may be the same as one or more of the targeted locations.

Defect detection component 120 can process the image or previous results, to derive (408) information related to the targeted locations. In some embodiments, deriving may include assigning a score to each targeted location and determining information related to the environment of the targeted location as described in association with step (308). In other embodiments, deriving may include retrieving the relevant information which may have been obtained by previous processing.

It will be appreciated that obtaining the targeted locations (400) and obtaining the image (404) may be performed in any required order, simultaneously, or the like.

Defect outputting component 125 may then output (412) the information related to the targeted locations, optionally including an indication that the location is targeted. The information may include data such as the score assigned to the targeted location, noise level at the vicinity of the target location, a pattern, location on the object, or the like.

The information related to the targeted locations may be output together with, and in a similar manner to, the information related to the previously detected potential defects, which may have been used for determining whether the targeted locations have been output, as described in step 400 above. A targeted location may be identified as such by a corresponding indication, or in accordance with a score that is lower than a threshold, which is why the location was not identified as a potential defect.

In some situations, for example when the output comprises targeted locations in which defects have not been detected, recipe modification component 126 may modify (416) the detection recipe used for detecting the defects. In some embodiments, the image capturing parameters or thresholds may be modified. In further embodiments, the detection recipe or parts, parameters or thresholds thereof, may be changed, subject to the defects not being detected.

Those skilled in the art will readily appreciate that the teachings of the presently disclosed subject matter are not bound by the method illustrated in FIG. 3 or FIG. 4. Other appropriate algorithms and combinations thereof can be implemented in order to obtain minority defects and train a classifier accordingly.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. An examination system to detect defects in a specimen, the system comprising a processing and memory circuitry (PMC) to:
   obtain an image of at least a part of a specimen, the image comprising a plurality of pixels, the image acquired by an examination tool;
   process the image in run-time in accordance with a detection recipe to derive information related to potential defects in the specimen, wherein:
      the detection recipe comprises a set of instructions for determining a score for each pixel of the plurality of pixels, and detecting potential defects based on the score satisfying a threshold condition; and
      said information comprises a first data set informative of first locations identified, in accordance with the detection recipe, as locations of potential defects, and a second data set informative of second locations not identified, in accordance with the detection recipe, as locations of potential defects;
   receive data specifying at least one targeted location of interest within the at least a part of the specimen;
   in response to determining the first data set is not informative of the at least one targeted location of interest, generate a third data set by adding, to the first data set from the second data set, added information related to the at least one targeted location of interest, the added information bearing an indication that it corresponds to the at least one targeted location of interest; and
   output the third data set usable for examining the at least one targeted location of interest.

2. The system of claim 1, wherein the added information comprises at least one item selected from the group consisting of: a pattern, a reference gray level, a noise level, and details output in accordance with the detection recipe in accordance with the at least one targeted location of interest.

3. The system of claim 1, wherein the at least one targeted location of interest comprises a plurality of targeted locations of interest over at least the part of the specimen.

4. The system of claim 1, wherein:
   the score is indicative of a probability that the pixel reflects a defect or part of a defect; and
   detecting potential defects based on the score satisfying the threshold condition comprises setting a threshold, and detecting as potential defects only pixels for which the respective score exceeds the threshold.

5. The system of claim 4, wherein the PMC further updates the detection recipe based on an examination of the at least one targeted location of interest, such that the score at the at least one targeted location of interest exceeds the threshold.

6. The system of claim 1, wherein the PMC further:
   receives at least one characteristic of a defect of interest located at the at least one targeted location of interest; and
   modifies within the image at least one pixel from the plurality of pixels corresponding to the at least one targeted location of interest, wherein the modification is performed in accordance with the at least one characteristic of the defect of interest, thereby planting the defect of interest into the image.

7. An examination system to detect defects in a specimen, the system comprising a processing and memory circuitry (PMC) for:
   receiving data specifying at least one targeted location of interest within at least a part of the specimen, wherein the at least one targeted location of interest differs from locations of potential defects previously revealed in accordance with a detection recipe, and wherein the detection recipe comprises a set of instructions for determining a score for each pixel of the plurality of pixels, and detecting potential defects based on the score satisfying a threshold condition;
   obtaining an image of the at least a part of the specimen, the image acquired by an examination tool;
   processing the image in run-time, in accordance with the detection recipe, to derive information related to the at least one targeted location of interest; and
   outputting the information related to the at least one targeted location usable for examining the at least one targeted location of interest.

8. The system of claim 7, wherein the information is output along with information related to the locations of potential defects.

9. The system of claim 7, wherein the information comprises at least one item selected from the group consisting of: a pattern, a reference gray level, a noise level, and details output by the detection recipe in accordance with the at least one targeted location.

10. The system of claim 7, wherein the at least one targeted location of interest is received with additional information.

11. The system of claim 7, wherein the at least one targeted location of interest comprises a plurality of mandatory locations of interest over the specimen.

12. The system of claim 7, wherein:
   the score is indicative of a probability that the pixel reflects a defect or part thereof; and
   detecting potential defects based on the score satisfying the threshold condition comprises setting a threshold, and detecting as potential defects only pixels for which the respective score exceeds the threshold.

13. The system of claim 12, wherein the PMC is further configured for updating the detection recipe in accordance with the score at the least one targeted location of interest.

14. The system of claim 7, wherein the PMC further:
receives at least one characteristic of a defect of interest located at the at least one targeted location of interest; and
modifies within the image at least one pixel from the plurality of pixels corresponding to the at least one targeted location of interest, wherein the modification is provided in accordance with the at least one characteristic of the defect of interest, thereby planting the defect of interest into the image.

15. A method of specimen examination, comprising:
obtaining, by a processing and memory circuitry (PMC), an image of at least a part of a specimen, the image comprising a plurality of pixels, the image acquired by an examination tool;
processing, by the PMC in accordance with a detection recipe, the image to derive information related to potential defects in the specimen, wherein:
the detection recipe comprises a set of instructions for determining a score for each pixel of the plurality of pixels, and detecting potential defects based on the score satisfying a threshold condition; and
said information comprises a first data set informative of first locations identified, in accordance with the detection recipe, as locations of potential defects, and a second data set informative of second locations not identified, in accordance with the detection recipe, as locations of potential defects;
receiving, by the PMC, data specifying at least one targeted location of interest within the at least a part of the specimen;
determining, by the PMC, that the first data set is not informative of the at least one targeted location of interest;
in response to determining that the first data set is not informative of the at least one targeted location of interest, generating, by the PMC, a third data set by adding, to the first data set from the second data set, added information related to the at least one targeted location of interest, the added information bearing an indication that it corresponds to the at least one targeted location of interest; and
outputting the third data set usable for examining the at least one targeted location of interest.

16. The method of claim 15, wherein the information related to the at least one targeted location of interest comprises at least one item selected from the group consisting of: a pattern, a reference gray level, a noise level, and details output in accordance with the detection recipe in accordance with the at least one targeted location of interest.

17. The method of claim 15, wherein the at least one targeted location comprises a plurality of targeted locations over at least the part of the specimen.

18. The method of claim 15, wherein:
the score is indicative of a probability that the pixel reflects a defect or part of a defect; and
detecting potential defects based on the score satisfying the threshold condition comprises setting a threshold, and detecting as potential defects only pixels for which the respective score exceeds the threshold.

19. The method of claim 18, further comprising updating, by the PMC, the detection recipe based on an examination of the at least one targeted location of interest, such that the score at the at least one targeted location of interest exceeds the threshold.

20. The method of claim 15, further comprising:
receiving, by the PMC, at least one characteristic of a defect of interest located at the at least one targeted location; and
modifying, by the PMC within the image, at least one pixel from the plurality of pixels corresponding to the at least one targeted location, wherein the modification is performed in accordance with the at least one characteristic of the defect of interest, thereby planting the defect of interest into the image.

\* \* \* \* \*